(12) United States Patent
Bracher et al.

(10) Patent No.: US 9,346,256 B2
(45) Date of Patent: May 24, 2016

(54) METHOD FOR PRODUCING PRINTED PRODUCTS

(71) Applicant: Muller Martini Holding AG, Hergiswil (CH)

(72) Inventors: Markus Bracher, Pfaffnau (CH); Daniel Lutziger, Birmensdorf (CH)

(73) Assignee: MUELLER MARTINI MARKETING AG, Hergiswil (CH)

( * ) Notice: Subject to any disclaimer, the term of this patent is extended or adjusted under 35 U.S.C. 154(b) by 0 days.

(21) Appl. No.: 14/885,572

(22) Filed: Oct. 16, 2015

(65) Prior Publication Data

US 2016/0107434 A1    Apr. 21, 2016

(30) Foreign Application Priority Data

Oct. 16, 2014 (CH) ...................................... 1589/14

(51) Int. Cl.
  *B41F 33/00*   (2006.01)
  *B41F 13/54*   (2006.01)
  *G06K 15/02*   (2006.01)

(52) U.S. Cl.
  CPC ................ *B41F 13/54* (2013.01); *G06K 15/02* (2013.01)

(58) Field of Classification Search
  CPC ...................................................... B41F 13/54
  See application file for complete search history.

(56) References Cited

U.S. PATENT DOCUMENTS 6,817,295 B2 * 11/2004 Metzler ................... B41F 13/14
101/483

FOREIGN PATENT DOCUMENTS

| DE | 102008033184 A1 | 3/2010 |
|----|-----|-----|
| EP | 1777078 A1 | 4/2007 |
| EP | 2492107 A1 | 8/2012 |
| EP | 2636536 A1 | 9/2013 |
| WO | WO-2012048435 A1 | 4/2012 |

OTHER PUBLICATIONS

International Search Report of CH 15892014 dated Jan. 16, 2015.

* cited by examiner

*Primary Examiner* — Blake A Tankersley
*Assistant Examiner* — Ruben Parco, Jr.
(74) *Attorney, Agent, or Firm* — FisherBroyles, LLP; Robert Kinberg

(57) ABSTRACT

A method for producing printed products in a production plant, equipped with a digital printing press and at least one post-print processing machine arranged downstream of the digital printing press. The printed products are produced according to work orders for which the digital printing press prints on a print material web. The post-print processing machine processes the print material web into printed products. The production plant is converted for producing different printed products to be produced in a following work order, relative to a preceding work order. A time interval is initially determined for adjusting the post-print processing machine with the longest adjustment time. The post-print processing machine to be adjusted begins with the adjustment as soon as the last printed product of the preceding work order leaves this post-print processing machine. The post-print processing machine to be adjusted then starts processing the following work order as soon as the predetermined time interval for adjusting the post-print processing machine has elapsed.

11 Claims, 2 Drawing Sheets

METHOD FOR PRODUCING PRINTED PRODUCTS

CROSS-REFERENCE TO RELATED APPLICATIONS

Priority is claimed herein to Swiss Application No. 01589/14, filed Oct. 16, 2014, the entire disclosure of which is incorporated herein by reference in its entirety.

BACKGROUND OF THE INVENTION

The present invention relates to a method for producing printed products in a production plant, equipped with a digital printing press and at least one post-print processing machine that is arranged downstream of the digital printing press. The printed products are produced in accordance with work orders, which are processed in that the digital printing press prints images and process-technical elements onto a print material web, transported with a first web speed in a conveying direction. The at least one post-print processing machine further produces printed products from the print material web, wherein the production plant is changed over if different printed products are to be produced during a following work order, as compared to a previous work order. The conversion involves adjusting at least one of the post-print processing machines during a conversion interval, wherein the web material is transported further by the digital printing press during the conversion interval.

As compared to traditional printing presses, digital printing presses offer ideal preconditions for printing small editions of printed products such as books, magazines, newspapers and the like. Processes such as the manufacturing of printing plates, the use of print rollers and the set-up costs are omitted completely since the book data can be used directly for the printing process with the digital printing process. In order for these advantages to be used in a production plant, consisting of a digital printing press and at least one post-print processing machine, new and innovative solutions are required during the post-print processing.

A digital printing press can generally print on an endlessly circulating paper web having a width of approximately 1 m, at a rate of up to about 4 m/s. In the process, technical elements such as print and/or cutting marks, barcodes for identifying individual pages and the like are also printed on the paper web in addition to the printed images. The paper web is imprinted sequentially, meaning during a single run and in the correct sequence in which the pages are supposed to be arranged in the future product, following all post-print processing operations.

As a result of this sequential printing, small editions can be produced immediately following each other. With a single-copy edition of a printed product, products having differing contents are printed successively. If other parameters of the printed product also change, e.g. format, thickness, height, width of the printed product, the downstream arranged post-print processing machines must also be adjusted accordingly.

Adjusting an individual post-print processing machine of this type, embodied as thread stitcher, is known from the European patent document EP 2492107 A1. For this, a predetermined sequence for a clocked processing of printed products is input into a central control unit, and the sequence is then processed in the control unit. If it is determined that the time available for adjusting the post-print processing machine is not sufficient, at least one idle cycle is inserted. With an idle or empty cycle of this type, no printed product is conveyed further and a gap develops in the material flow of the post-print processing machine during the adjustment phase, which is then detected in a downstream-arranged additional machine, e.g. a sewing station, and is transformed to a dummy pass. To be sure, this thread-stitching machine can process printed products of various formats within a uniform production operation, but the necessary adjustment of the post-print processing machine is possible only during an interval which corresponds to a multiple of an idle cycle. Accordingly, the time for this adjustment is not infinitely variable.

An arrangement for producing individual books or very small editions is described in German patent document DE 102008033184 A1, for which a post-print processing machine embodied as an adhesive binder is connected to at least one digital printing press to form a production plant or plant. If the production plant must be converted because of different formats and features for the books to be processed, then the adhesive binder, for example, is correspondingly adjusted by respectively inserting at least one idle cycle. Waste paper is produced during this adjustment period, wherein each idle cycle causes a time loss in the production process.

SUMMARY OF THE INVENTION

It is an object of the invention to provide a method for producing printed products in a production plant, equipped with a digital printing press and at least one post-print processing machine arranged downstream of the digital printing press. With this arrangement, the production time and the material consumption are minimized during the conversion phase of the production plant for successive work orders, meaning in case of a change in the order.

The above and other objects are achieved by a method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form printed products, wherein the production plant is converted if a following work order requires a production of different printed products than for a preceding work order, wherein the conversion involves an adjustment operation in which an adjustment is made during a conversion interval to at least one of the post-print processing machines and wherein the print material web continues to be transported through the digital printing press during the conversion interval. According to one embodiment of the invention the method comprises: initially, determining a time interval for adjusting a post-print processing machine having a longest adjustment time; beginning adjustment of the at least one post-print processing machine to be adjusted as soon as the last printed product of the preceding work order leaves the post-print processing machine to be adjusted; and starting processing the following work order by the at least one post-print processing machine to be adjusted as soon as the determined time interval for adjusting the post-print processing machine with the longest adjustment time has elapsed, following a start of the adjustment operation.

As a result, it is ensured that all components of the production plant, which are arranged upstream of the post-print processing machine with the longest adjustment interval, already process the following work order while this post-print processing machine is being adjusted and that the material web and/or the printed products reach and/or have reached this post-print processing machine immediately after the conversion. As compared to the prior art, this prevents web material from becoming unusable and also results in a shortening of the production time.

According to a further embodiment, the digital printing press prints only process-technical elements onto the web during the conversion of the production plant for the determined interval. This results in a saving of ink since the digital printing press does not print images onto the print material web.

With a further embodiment, this time interval is determined in a central control unit for the production plant. Several configurations of production plants equipped with post-print processing machines can thus advantageously be considered, and a specific time interval can be determined and stored for future uses.

According to another embodiment, the print material web is conveyed and imprinted with an unchanged first web speed during the conversion of the production plant. The upstream-arranged digital printing press can thus be operated normally, without having to consider speed deviations or changes.

According to another embodiment, the print material web is transported and imprinted during the conversion of the production plant with a second, reduced web movement speed, relative to the first web movement speed. A more complex changeover of the print material web can thus take place at full production speed.

According to a different modification embodiment, at least one post-print processing machine of the production plant is a folding device. The production plant in that case is converted by adjusting the folding device, wherein the print material web for successive work orders is folded according to an unchanged folding pattern and wherein printed products with a varying format are produced by cutting the single print material web transverse to the conveying direction and folding it according to the unchanged folding pattern. The folding device is adjusted only minimally in that case, e.g. to produce an overfold. This provides a further option of varying the format, for example if successively printed products are produced with different formats, to be sure, but an adjustment of the folding device is not necessary.

Alternatively and according to another embodiment, the folding device can also be adjusted if a different folding pattern is required.

According to a further embodiment, a feed device for the print material web may be arranged upstream of the digital printing press, wherein the conversion of the production plant involves the adjusting during the conversion time of at least one post-print processing machine and at least one of the feed device and the digital printing press. When determining the time interval for adjusting the post-print processing machine which requires the longest adjustment interval, the time required for adjusting the feed device and/or the digital printing press is also determined and, if applicable, recorded as the longest adjustment interval. The at least one post-print processing machine to be adjusted and the feed device to be adjusted and/or the digital printing press to be adjusted respectively starts the adjustment as soon as the last printed product and/or the print material web of the preceding work order leaves this post-print processing machine or the feed device and/or the digital printing press. The at least one post-print processing machine to be adjusted and the feed device and/or the digital printing press respectively starts processing the following work order as soon as the predetermined time interval for the adjustment has elapsed. With this modification of the method, all adjustment intervals for additional components of the production plant are determined at the same time, in particular those of the feed device and/or the digital printing press, so that their effects on the method if applicable can be considered.

BRIEF DESCRIPTION OF THE DRAWINGS

The invention is explained further in the following with the aid of drawings, wherein.

DETAILED DESCRIPTION OF THE INVENTION

Figure 1:
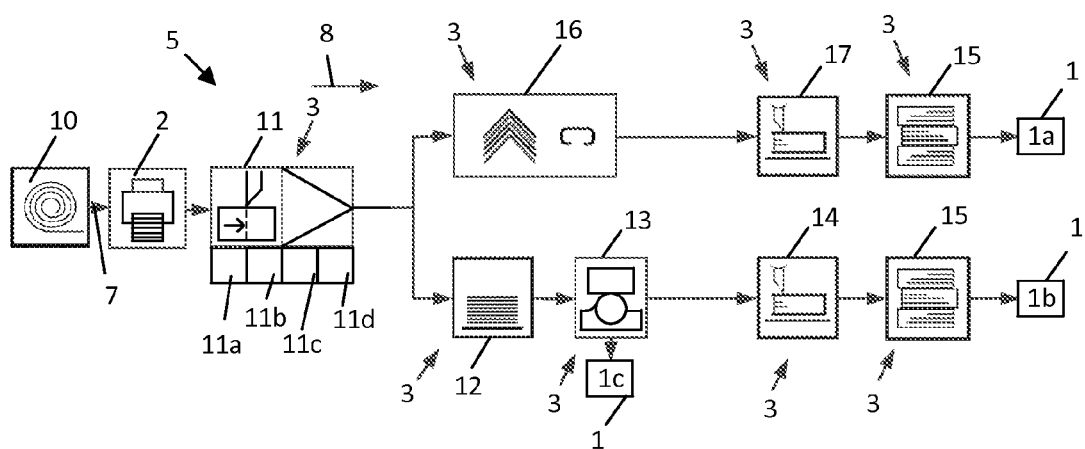
FIG. 1 is an exemplary configuration of several production plants in the form of a block diagram.

FIG. 1 shows exemplary configurations of several production plants 5 for producing printed products 1, in a joint representation of a block diagram. The actually used configuration depends on the respective printed products 1 to be produced. These products can be gathered and wire-stitched products 1a, adhesive bound products 1b or stacks of signatures 1c which can be processed further either online or offline. All configurations comprise a digital printing press 2, wherein a feed device 10 embodied as a roll changer for the print material web 7 is arranged upstream of the digital printing press 2, in a conveying direction 8 of the printed products 1, and a folding device 11 that is embodied as a post-print processing machine 3 is arranged downstream of the digital printing press 2. In this case, four processing machines are arranged successively in the illustrated folding device 11, that is a funnel-type folding device 11a, a cross cutter 11b, a transverse folding device 11c and a longitudinal folding device 11d.

For producing gathered and wire-stitched products 1a, additional post-print processing machines 3 such as a gathering and wire-stitching machine 16, a cutter 17, and a packaging device 15 are arranged downstream of the folding device 11.

For a second, alternative production of adhesive-bound products 1b, a gathering machine 12, an adhesive binder 13, a cutting device 14 and a packaging device 15 are arranged downstream of the folding device 11.

For a third, alternative production of a stack of signatures 1c, only a gathering machine 12 is arranged downstream of the folding device 11.

Figure 2:
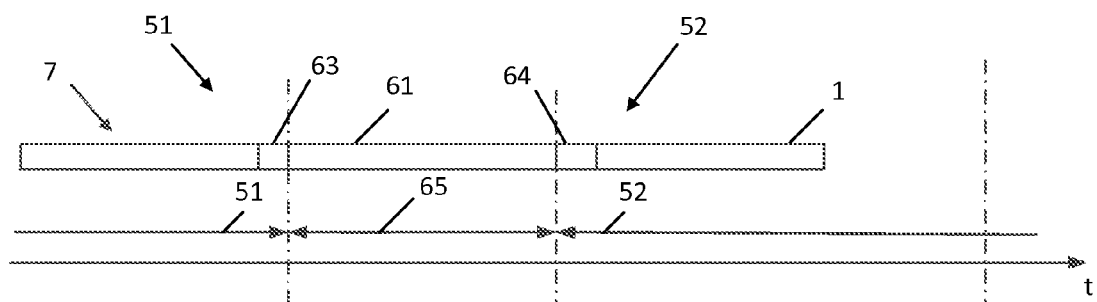
FIG. 2 is a diagram of method steps according to the prior art for adjusting a post-print processing machine, embodied as a folding device.

In FIG. 2, the method steps for a change in successive work orders are shown schematically along a time axis t, meaning the change from a first work order 51 to a second work order 52 and the adjustment of a single post-print processing machine 3 in a production plant according to the prior art. The print material web 7 symbolically shows print products 1 having a different format for a first work order 51 compared to a second work order 52. If it is determined in the process that the time interval available for adjusting the post-print processing machine 3 is not sufficient, at least one idle cycle 65 is inserted. Following the first work order 51, meaning once the last printed product 63 of this order 51 is completed, waste paper 61 is generated during the at least one idle cycle 65 that is inserted for adjusting the post-print processing machine 3. The first good printed product 64 of the second printing order 52 can be produced only following the completion of the adjustment operation.

Figure 3:
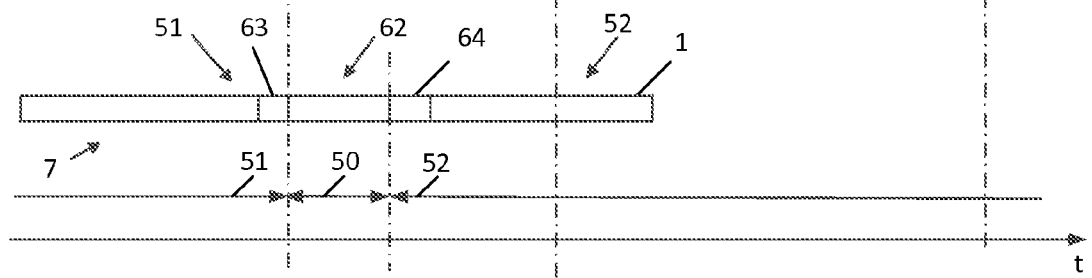
FIG. 3 is a diagram of method steps according to the invention for adjusting a post-print processing machine, embodied as a folding device.

FIG. 3 illustrates the method steps according to an embodiment of the invention during a job change from a first work order 51 to a second work order 52, shown schematically along the time axis t, with an empty job 50 in-between for adjusting the post-print processing machine 3 and/or the feed device 10. The print material web 7 again symbolically shows printed products 1 with different formats for the first work order 51, relative to the second work order 52. Following the completion of the first work order 51 and the last printed product 63 of this work order 51, the web 62 is no longer printed on while the post-print processing machine 3 and/or the feed device 10 is adjusted. Thus, the first good printed product 64 of the second work order 52 can be produced faster, following the completion of the adjustment operation, than is possible according to the prior art because it is not necessary to wait for idle cycles 65 to pass.

With this method, a time interval is initially determined which requires the longest adjustment time corresponding to the empty job 50 for adjusting the post-print processing machine 3. The at least one post-print processing machine 3 then starts the adjustment operation as soon as the last printed product 1 of the preceding work order 51 leaves this post-print processing machine 3. The at least one post-print processing machine 3 to be adjusted starts processing the following work order 52 as soon as the longest determined interval required for adjusting the post-print processing machine 3 has elapsed.

When determining the time interval for the empty job 50 in a central control unit of the production plant, several configurations for production plants with different post-print processing machines and/or feed devices can be taken into consideration, and a specific time interval can accordingly be determined for each of these configurations and can be stored for future uses.

According to the block diagram in FIG. 1, different configurations exists for the production plants 5. If different formats are required for the gathering and wire-stitching products 1a, the adhesive binder products 1b or the stacked signatures 1c, at least one of the post-print processing machines 3 and/or the feed device 10 of the production plant 5 must be adjusted for two successively following work orders 51, 52.

In a first example for operating the production plant 5 to produce gathering and wire-stitching products 1a, adhesive binder products 1b or stacks of signatures 1c, the printed products of successively following work orders 51, 52 are intended to have different cutting lengths, thus requiring the following conversion of the production plant 5:

At the feed device 10: no adjustment is made;
At the digital printing press 2: no adjustment is made;
At the funnel-type folding device 11a: no adjustment is made;
At the cross cutter 11b: a knife cylinder is adjusted in a first step to the new format, wherein a shorter cutting length requires a faster rotational movement of the knife cylinder, relative to the print material web 7. In the second step, a cutting angle is adjusted to the new format.
At the transverse folding device 11c: A folding sword is adjusted to the new cutting length. The smaller the cutting length, the faster the rotational movement must be, relative to the print material web 7.
At the longitudinal folding device 11d: 1) A folding sword is adjusted to the new cutting length, wherein a smaller cutting length requires a faster rotational movement of the folding sword, relative to the print material web 7. 2) A sheet end stop and a folding-format height are adjusted to the new cutting length.

In a second example for operating the production plant 5, the printed products of successively following work orders 51, 52 are to have different longitudinal folding positions and print materials. In that case, the production plant 5 is converted as follows:

Feed device 10: When using a different print material, the print material roll is changed. The previously used print material web 7 is cut and a new print material web 7 is glued onto the end of the old one. The sensors for the web edge control are then adjusted to the width of the new print material web 7.
Digital printing press 2: The sensors for the web edge control are adjusted to the width of the new print material web 7.
Funnel-type folding device 11a: The funnel positions, the turning rods and the length adjustments are computed based on the width of the new print material web 7 and the folding pattern and are adjusted correspondingly to be synchronized with the speed of this print material web 7.
Cross cutter 11b: No adjustment is made.
Transverse folding device 11c: With a change in the thickness of the print material web 7 or the new folding pattern, the folding cylinders are reset to the new sheet thickness.
Longitudinal folding device 11d: With a change in the thickness of the print material web 7 or the new folding pattern, the folding rollers are adjusted to the new sheet thickness. With a change in the folding pattern, meaning with a new sheet width, the folding format height is adjusted.
The other post-print processing machines 3 of the production plant 5 are also adjusted as needed.

Of course, the method can also involve an adjustment of the feed device 10 and/or the digital printing press 2, as required.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form the printed products, wherein the production plant is converted if a following work order requires a production of different printed products than for a preceding work order, wherein a conversion involves an adjustment operation in which an adjustment is made during a conversion interval to the at least one post-print processing machine and wherein the print material web continues to be transported through the digital printing press during the conversion interval, the method comprising:

initially, determining a time interval for adjusting a post-print processing machine having a longest adjustment time;
beginning adjustment of the at least one post-print processing machine to be adjusted as soon as the last printed product of the preceding work order leaves the post-print processing machine to be adjusted;

starting processing the following work order by the at least one post-print processing machine to be adjusted as soon as the time interval for adjusting the post-print processing machine with the longest adjustment time has elapsed, following a start of the adjustment operation; and further including printing by the digital printing press only process-technical elements onto the print material web during the conversion interval.

2. The method according to claim 1, wherein determining the time interval includes determining the time interval in a central control unit of the production plant.

3. The method according to claim 1, further comprising transporting and printing on the print material web while the first web speed remains unchanged during the conversion of the production plant.

4. The method according to claim 1, further comprising the print material web is transported and imprinted during the conversion of the production plant with a second web speed that is reduced relative to the first web speed.

5. The method according to claim 1, wherein at least one post-print processing machine of the production plant is a folding device, and the method further comprises:

converting the production plant by adjusting the folding device;

folding the print material web for successive work orders according to an unchanged folding pattern; and producing the printed products with a different format by cutting the print material web transverse to the conveying direction and folding the cut print material web according to the unchanged folding pattern.

6. The method according to claim 1, wherein the at least one post-print processing machine of the production plant comprises a folding device, and the method further comprises:

converting the production plant by adjusting the folding device; folding the print material web according to a different folding pattern for successively following work orders; and producing the printed products with differing formats by cutting the print material web transverse to the conveying direction of the cut print material web according to the changed folding pattern.

7. The method according to claim 1, wherein a feed device for the print material web is arranged upstream of the digital printing press, wherein the conversion of the production plant comprises an adjustment of the at least one post-print processing machine and at least one of the feed device and the digital printing press during the conversion interval, the method further comprising:

determining a second time interval for adjusting the feed device and/or the digital printing press and recording the second time interval of the feed device or the digital printing press as the longest adjustment time if longer than the time interval of the post print processing machine;

beginning the adjustment of the at least one post-print processing machine, the feed device or the digital printing press to be adjusted, respectively, as soon as the last printed product or the print material web of the preceding work order leaves whichever of the post-print processing machine, the feed device or the digital printing press that has the longest adjustment time; and starting processing the following work order by the at least one post-print processing machine to be adjusted, the feed device or the digital printing press, respectively, as soon as the longer of the time interval and the second time interval for the adjustment has passed following the start of the adjustment operation.

8. A method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form the printed products, wherein the production plant is converted if a following work order requires a production of different printed products than for a preceding work order, wherein a conversion involves an adjustment operation in which an adjustment is made during a conversion interval to the at least one post-print processing machine and wherein the print material web continues to be transported through the digital printing press during the conversion interval, the method comprising:

initially, determining a time interval for adjusting a post-print processing machine having a longest adjustment time;

beginning adjustment of the at least one post-print processing machine to be adjusted as soon as the last printed product of the preceding work order leaves the post-print processing machine to be adjusted;

starting processing the following work order by the at least one post-print processing machine to be adjusted as soon as the time interval for adjusting the post-print processing machine with the longest adjustment time has elapsed, following a start of the adjustment operation; and transporting and printing on the print material web while the first web speed remains unchanged during the conversion of the production plant.

9. A method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form the printed products, wherein the production plant is converted if a following work order requires a production of different printed products than for a preceding work order, wherein a conversion involves an adjustment operation in which an adjustment is made during a conversion interval to the at least one post-print processing machine and wherein the print material web continues to be transported through the digital printing press during the conversion interval, the method comprising:

initially, determining a time interval for adjusting a post-print processing machine having a longest adjustment time;

beginning adjustment of the at least one post-print processing machine to be adjusted as soon as the last printed product of the preceding work order leaves the post-print processing machine to be adjusted;

starting processing the following work order by the at least one post-print processing machine to be adjusted as soon as the time interval for adjusting the post-print processing machine with the longest adjustment time has elapsed, following a start of the adjustment operation; and the print material web is transported and imprinted during the conversion of the production plant with a second web speed that is reduced relative to the first web speed.

10. A method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form the printed products, wherein the production plant is converted if a following work order requires a production of different printed products than for a preceding work order, wherein a conversion involves an adjustment operation in which an adjustment is made during a conversion interval to the at least one post-print processing machine and wherein the print material web continues to be transported through the digital printing press during the conversion interval, the method comprising:

initially, determining a time interval for adjusting a post-print processing machine having a longest adjustment time;

beginning adjustment of the at least one post-print processing machine to be adjusted as soon as the last printed product of the preceding work order leaves the post-print processing machine to be adjusted;

starting processing the following work order by the at least one post-print processing machine to be adjusted as soon as the time interval for adjusting the post-print processing machine with the longest adjustment time has elapsed, following a start of the adjustment operation; and wherein at least one post-print processing machine of the production plant is a folding device, and the method further comprises:

converting the production plant by adjusting the folding device;

folding the print material web for successive work orders according to an unchanged folding pattern; and producing the printed products with a different format by cutting the print material web transverse to the conveying direction and folding the cut print material web according to the unchanged folding pattern.

11. A method for producing printed products in a production plant, equipped with a digital printing press and at least one additional post-print processing machine arranged downstream of the digital printing press, wherein the printed products are produced according to work orders for which the digital printing press prints images and process-technical elements in a conveying direction onto a print material web transported with a first web speed, and wherein the at least one post-print processing machine then further processes the print material web to form the printed products, wherein the production plant is converted if a following work order requires a production of different printed products than for a preceding work order, wherein a conversion involves an adjustment operation in which an adjustment is made during a conversion interval to the at least one post-print processing machine and wherein the print material web continues to be transported through the digital printing press during the conversion interval, the method comprising:

initially, determining a time interval for adjusting a post-print processing machine having a longest adjustment time;

beginning adjustment of the at least one post-print processing machine to be adjusted as soon as the last printed product of the preceding work order leaves the post-print processing machine to be adjusted;

starting processing the following work order by the at least one post-print processing machine to be adjusted as soon as the time interval for adjusting the post-print processing machine with the longest adjustment time has elapsed, following a start of the adjustment operation; and wherein the at least one post-print processing machine of the production plant comprises a folding device, and the method further comprises:

converting the production plant by adjusting the folding device; folding the print material web according to a different folding pattern for successively following work orders; and producing the printed products with differing formats by cutting the print material web transverse to the conveying direction of the cut print material web according to the changed folding pattern.

* * * * *